US010484089B1

(12) United States Patent
Zhu et al.

(10) Patent No.: US 10,484,089 B1
(45) Date of Patent: Nov. 19, 2019

(54) DRIVER ASSISTED BY CHARGE SHARING

(71) Applicant: HEWLETT PACKARD ENTERPRISE DEVELOPMENT LP, Houston, TX (US)

(72) Inventors: Zhubiao Zhu, Fort Collins, CO (US); Clinton Harold Parker, Fort Collins, CO (US); Daniel Alan Berkram, Loveland, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/965,773

(22) Filed: Apr. 27, 2018

(51) Int. Cl.
| H04B 10/50 | (2013.01) |
| H04B 10/58 | (2013.01) |
| H04L 25/03 | (2006.01) |
| H04B 10/079 | (2013.01) |
| H03F 1/32 | (2006.01) |
| H03F 1/22 | (2006.01) |
| H05B 41/32 | (2006.01) |
| H03K 3/26 | (2006.01) |
| H03K 7/06 | (2006.01) |
| H03K 3/37 | (2006.01) |

(52) U.S. Cl.
CPC ..... *H04B 10/07953* (2013.01); *H04B 10/502* (2013.01); *H04B 10/58* (2013.01); *H04L 25/03343* (2013.01)

(58) Field of Classification Search
CPC ............ H04B 10/00; H04B 10/07953; H04B 10/077; H04B 10/58; H04B 10/502; H04J 14/02; H04J 14/0222; H04L 252/03343
USPC ............................................ 398/27, 25, 9, 1
See application file for complete search history.

(56) References Cited

U.S. PATENT DOCUMENTS

| 3,506,819 | A | * | 4/1970 | Gervasio | G06G 7/64 327/100 |
| 4,547,737 | A | * | 10/1985 | Gibson | H03D 3/006 329/343 |
| 4,551,691 | A | * | 11/1985 | Ogawa | H03K 3/2893 331/111 |
| 5,581,454 | A | * | 12/1996 | Collins | H02M 3/07 363/59 |

(Continued)

FOREIGN PATENT DOCUMENTS

| CN | 104135272 | 11/2014 |
| KR | 10-0951659 B1 | 4/2010 |

OTHER PUBLICATIONS

A CMOS 4-PAM Multi-Gbps Serial Link_Retrieved via Google.

(Continued)

*Primary Examiner* — Oommen Jacob
(74) *Attorney, Agent, or Firm* — McDermott Will & Emery LC

(57) ABSTRACT

A device, including a switch configured to couple a current source with an output terminal upon receipt of a data signal, is provided. The device also includes a first variable capacitor coupled in parallel to the current source at a common node on a source terminal of the switch, wherein the first variable capacitor comprises multiple capacitive elements coupled in parallel and configured to be activated by a programmable signal, and wherein the programmable signal is selected to increase a charge transfer rate from an output terminal coupled to a load, when the switch is turned on. A system and a serial interface including the above device are also provided.

20 Claims, 7 Drawing Sheets

(56) References Cited

U.S. PATENT DOCUMENTS

| | | | |
|---|---|---|---|
| 5,859,862 A | 1/1999 | Hikasa et al. | |
| 6,016,073 A * | 1/2000 | Ghilardelli | H02M 3/073 |
| | | | 327/390 |
| 6,788,148 B2 | 9/2004 | Orr | |
| 6,977,533 B2 | 12/2005 | Kernhof | |
| 7,282,993 B2 * | 10/2007 | Okamoto | H03F 3/193 |
| | | | 330/252 |
| 7,528,625 B2 | 5/2009 | Ozasa et al. | |
| 7,671,882 B2 | 3/2010 | Ozasa et al. | |
| 7,915,933 B2 * | 3/2011 | Vlasenko | H02M 1/34 |
| | | | 327/157 |
| 8,008,953 B1 * | 8/2011 | Brumett, Jr. | H03K 17/166 |
| | | | 327/109 |
| 8,022,736 B2 | 9/2011 | Chang | |
| 8,525,487 B1 * | 9/2013 | Stevenson | H02J 7/0065 |
| | | | 307/109 |
| 8,638,610 B2 * | 1/2014 | Imai | G11C 16/3404 |
| | | | 365/185.18 |
| 8,660,158 B2 | 2/2014 | Miyajima et al. | |
| 8,861,560 B2 | 10/2014 | Nedovic et al. | |
| 8,929,746 B2 | 1/2015 | Azadeh | |
| 8,947,008 B2 * | 2/2015 | Chuang | H05B 33/0887 |
| | | | 315/240 |
| 9,007,092 B2 * | 4/2015 | Kozuma | H03K 19/0013 |
| | | | 326/38 |
| 9,161,403 B2 | 10/2015 | Sugawara et al. | |
| 9,300,283 B1 * | 3/2016 | Jain | H03K 5/134 |
| 9,306,555 B2 | 4/2016 | Muljono et al. | |
| 9,401,703 B1 * | 7/2016 | Wang | H03K 7/06 |
| 9,603,210 B1 * | 3/2017 | Carlen | H05B 33/0818 |
| 9,614,511 B2 | 4/2017 | Blecher | |
| 9,781,789 B1 * | 10/2017 | Lee | H05B 33/0815 |
| 9,810,928 B2 | 11/2017 | Pobanz | |
| 2002/0176285 A1 | 11/2002 | Hunt | |
| 2006/0226916 A1 * | 10/2006 | Florescu | H03L 7/0898 |
| | | | 331/16 |
| 2008/0117943 A1 | 5/2008 | Nishiyama | |
| 2013/0187683 A1 | 7/2013 | Foroudi | |
| 2014/0184334 A1 * | 7/2014 | Nobbe | H03F 1/0227 |
| | | | 330/291 |
| 2016/0191029 A1 * | 6/2016 | Shuvalov | H03K 3/0231 |
| | | | 327/291 |
| 2016/0269120 A1 | 9/2016 | Halbritter | |
| 2017/0133989 A1 * | 5/2017 | Dykstra | H03F 1/3205 |
| 2017/0141735 A1 * | 5/2017 | Yuan | H03G 3/20 |
| 2017/0155384 A1 | 6/2017 | Fujino | |
| 2017/0187553 A1 | 6/2017 | Nedovic | |
| 2018/0302070 A1 * | 10/2018 | Parvizi | H03K 5/13 |
| 2018/0337732 A1 | 11/2018 | Ogata et al. | |
| 2019/0045283 A1 | 2/2019 | Troiani et al. | |

OTHER PUBLICATIONS

Capacitively Coupled CMOS VCSEL Driver Circuits for Optical_ Retrieved via Google.

IO Impedance Matching Algorithm for high-Performance ASICs_ Retrieved via Google Scholar.

Optical Interconnect Forum, accessed on Nov. 3, 2016, available online at <http://www.oiforum.com>.

N. Quadir et al, "A 56Gb/s PAM-4 VCSEL driver circuit", ISSC 2012, NUI Maynooth, Jun. 28-29.

M. Bassi, et al., "A 45Gb/s PAM-4 transmitter delivering 1.3Vppd output swing with 1V supply in 28nm CMOS FDSOI," ISSCC, pp. 66-67, Feb. 2016.

J. Lee, et al., "Design of 56Gb/s NRZ and PAM4 SerDes Transceivers in CMOS Technologies," IEEE JSSC, vol. 50, No. 9, pp. 2061-2073, Sep. 2015.

J. Kim, et al., "A 16-to-40Gb/s quarter-rate NRZ/PAM4 dual-mode transmitter in 14nm CMOS," ISSCC, pp. 60-61, Feb. 2015.

Giovanni Steffan et al, "A 64Gb/s PAM-4 Transmitter with 4-Tap FFE and 2.26pJ/b Energy Efficiency in 28nm CMOS FDSOI", ISSCC 2017 / Session 6 / Ultra-High-Speed Wireline / 6.4.

A. Nazemi, et al., "A 36Gb/s PAM4 transmitter using an 8b 18GS/S DAC in 28nm CMOS," ISSCC, pp. 58-59, Feb. 2015.

International Search Report and Written Opinion received for PCT Patent Application No. PCT/US19/29482, dated Sep. 10, 2019, 14 pages.

* cited by examiner

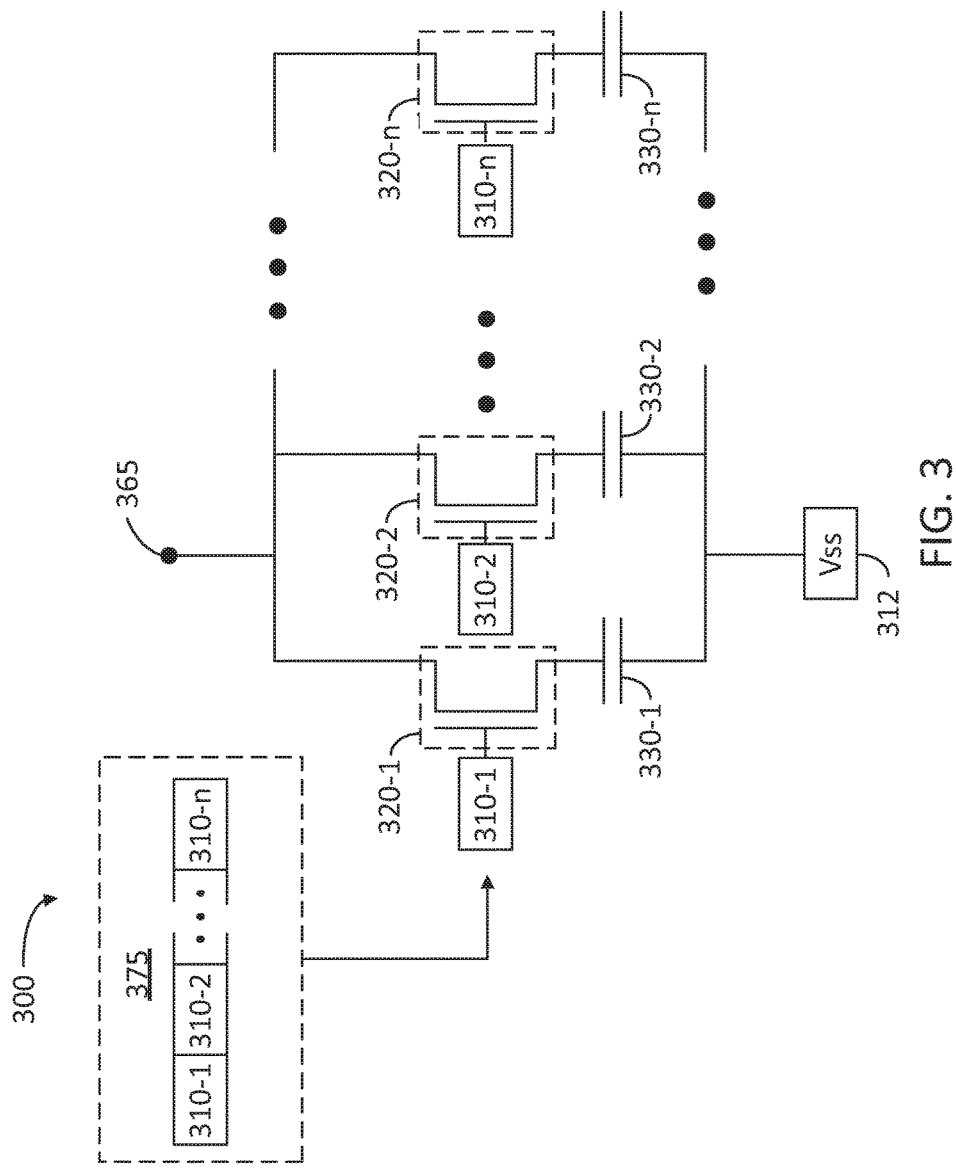

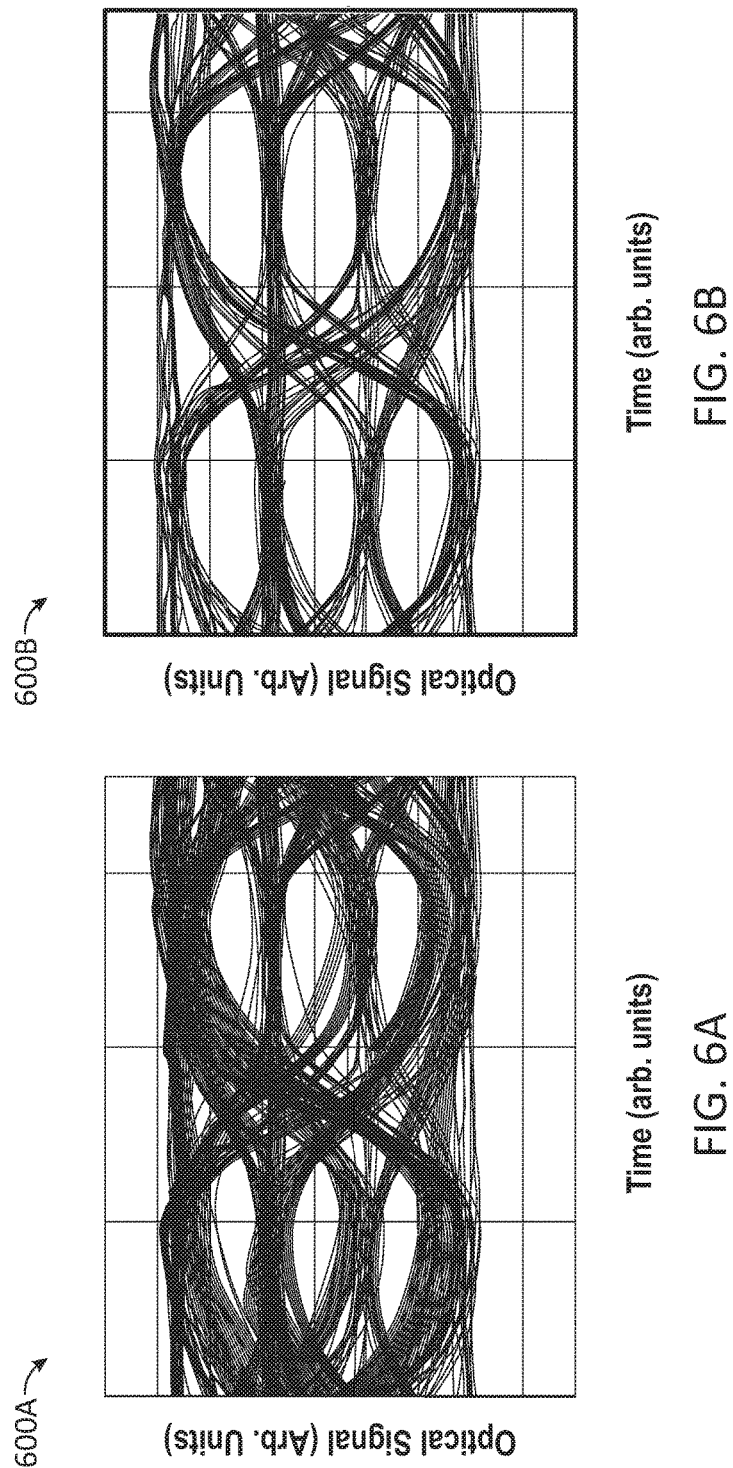

DRIVER ASSISTED BY CHARGE SHARING

TECHNICAL FIELD

Embodiments described herein are generally related to the field of opto-electronic device transducers. More specifically, embodiments described herein are related to compact and efficient current supplies for opto-electronic data conversion.

BACKGROUND

Current opto-electronic systems are expected to operate at high data rates that impose stringent conditions on the capacitive response of the driver terminations. The optical transducer involves a light emitting diode device having a slew rate that is less than ideal, and which ultimately produces a degraded bit-error-rate (BER) in the opto-electronic data conversion. Moreover, the less than ideal slew rate behavior is asymmetric for the signal rise and for the signal drop, thus reducing even further the BER performance of the device.

The description provided in the background section should not be assumed to be prior art merely because it is mentioned in or associated with the background section. The background section may include information that describes one or more aspects of the subject technology.

SUMMARY

In certain aspects, a device as disclosed herein includes a switch configured to couple a current source with an output terminal upon receipt of a data signal. The device also includes a first variable capacitor coupled in parallel to the current source at a common node on a source terminal of the switch, wherein the first variable capacitor comprises multiple capacitive elements coupled in parallel and configured to be activated by a programmable signal, and wherein the programmable signal is selected to increase a charge transfer rate from an output terminal coupled to a load, when the switch is turned on.

In certain aspects, a system as disclosed herein includes a light emitting device, a data channel configured to provide a data signal, and a switch configured to couple a current source with the light emitting device upon receipt of the data signal. The system also includes a first variable capacitor coupled in parallel to the current source at a common mode node on a source terminal of the switch, wherein the first variable capacitor comprises a plurality of capacitive elements coupled in parallel and configured to be activated by a programmable signal, and wherein the programmable signal is selected to increase a slew rate from the light emitting device when the switch is turned on and when the switch is turned off.

In certain aspects, a serial interface includes an opto-electronic data link. The opto-electronic data link includes a light emitting device configured to convert an electric input signal into an optical output signal, a data channel configured to provide the electric input signal, and a switch configured to couple a current source with the light emitting device upon receipt of the electric input signal. The opto-electronic data link also includes a variable capacitor coupled in parallel to the current source at a common node on a source terminal of the switch. The variable capacitor comprises multiple capacitive elements coupled in parallel and configured to be activated by a programmable signal, wherein the programmable signal is selected to reduce a bit error rate between the electric input signal and the optical output signal.

In certain aspects, a system is described including a means for coupling a current source with an output terminal upon receipt of a data signal. The system further includes a means to generate an optical signal from the data signal. The means for coupling a current source with an output terminal includes a switch configured to couple a current source with an output terminal upon receipt of a data signal. The means for coupling a current source with an output terminal also includes a first variable capacitor coupled in parallel to the current source at a common node on a source terminal of the switch, wherein the first variable capacitor comprises multiple capacitive elements coupled in parallel and configured to be activated by a programmable signal, and wherein the programmable signal is selected to increase a charge transfer rate from an output terminal coupled to a load, when the switch is turned on.

BRIEF DESCRIPTION OF THE DRAWINGS

FIG. 3 illustrates a variable capacitor for charge sharing in an opto-electronic system, according to some embodiments.

FIGS. 6A-B illustrate multi-level eye diagrams for a serial interface assisted by a charge-sharing element, according to some embodiments.

In the figures, elements and steps denoted by the same or similar reference numerals are associated with the same or similar elements and steps, unless indicated otherwise.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Electrical and optical link migration use serial interfaces operating at increasing data rates. Low bandwidth is a strict constraint at high bit rates, or with high input/output (IO) capacitance loads. This may be the case with drivers for typical vertical cavity emitting light diodes (VCSEL). In some cases, serial interfaces include equalization steps to remove VCSEL ringing and high impedance issues. To resolve the constraint of low bandwidth at high bit rates, embodiments disclosed herein include a push-pull driver (e.g., for a VCSEL) with assisted charge sharing for bandwidth enhancement.

While some serial interfaces still use a non-return-to-zero (NRZ) scheme, direct modulation of the light emitting device is desired for practical signal integrity constraints, especially for some interconnect applications and low-loss profiles. High-speed transmitters for serial interfaces as disclosed herein may improve the "eye opening" in a BER diagram for transitions between non-adjacent levels, including wide bandwidth and tight timing constraints. Accordingly, embodiments as disclosed herein provide high data-rates while maintain signal integrity and energy efficiency, e.g., at 56 Gigabits per second (Gb/s) data rates with 4-taps of feedforward equalization (FFE).

Figure 1:
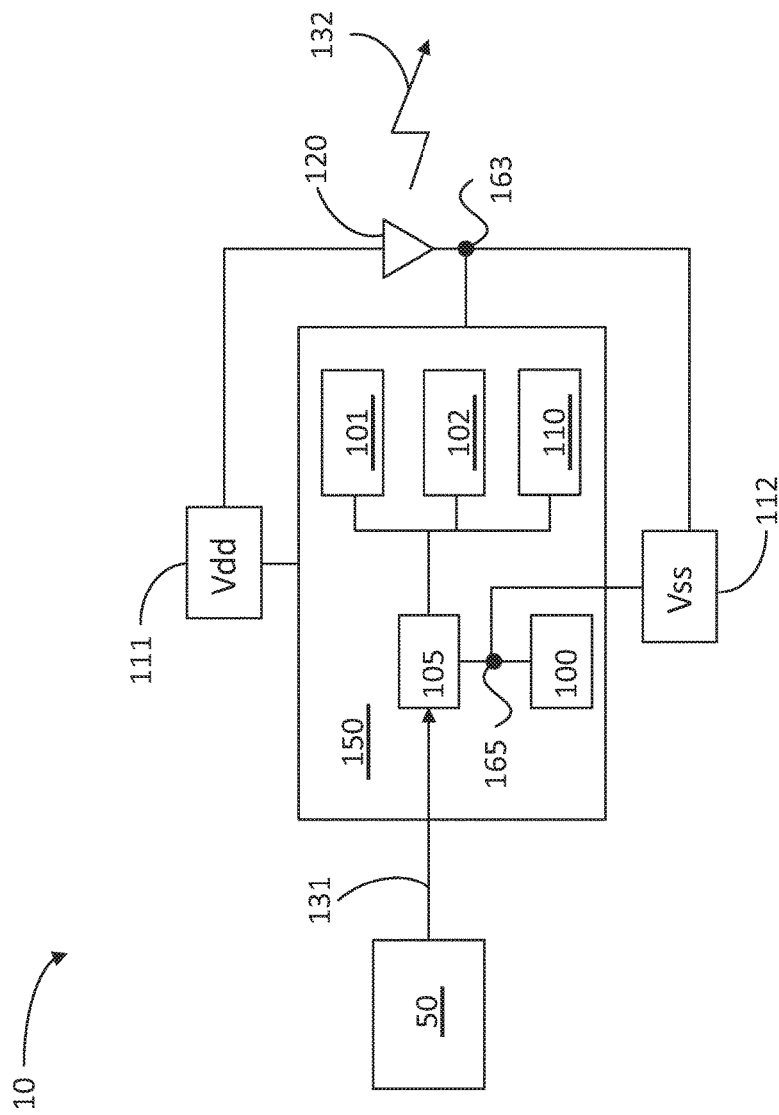
FIG. 1 illustrates an opto-electronic system including a charge-sharing element, according to some embodiments.

FIG. 1 illustrates an opto-electronic data link 10 including a charge-sharing element 100, according to some embodiments. Opto-electronic data link 10 may be part of a serial interface including a light emitting device 120 configured to convert an electric input signal 131 into an optical output signal 132. A data channel 50 provides electric input signal 131 to trigger a switch 105 coupling a current source 150 with light emitting device 120 upon receipt of electric input signal 131. Current source 150 may include an auxiliary current source 101 coupled with a main current source 102 to modulate a current to light emitting device 120 above and below a bias current provided by a first current source 110. Current is provided to light emitting device 120 through an output node 163.

Opto-electronic data link 10 also includes a variable capacitor 100 coupled in parallel to current source 150 at a common node 165 on a source terminal of switch 105. In some embodiments, variable capacitor 100 is adjusted to reduce a bit error rate between electric input signal 131 and optical output signal 132. Power to current source 150 is provided by a high voltage source 111 (Vdd) and a low voltage source 112, or sink (Vss, e.g., ground).

Figure 2A:
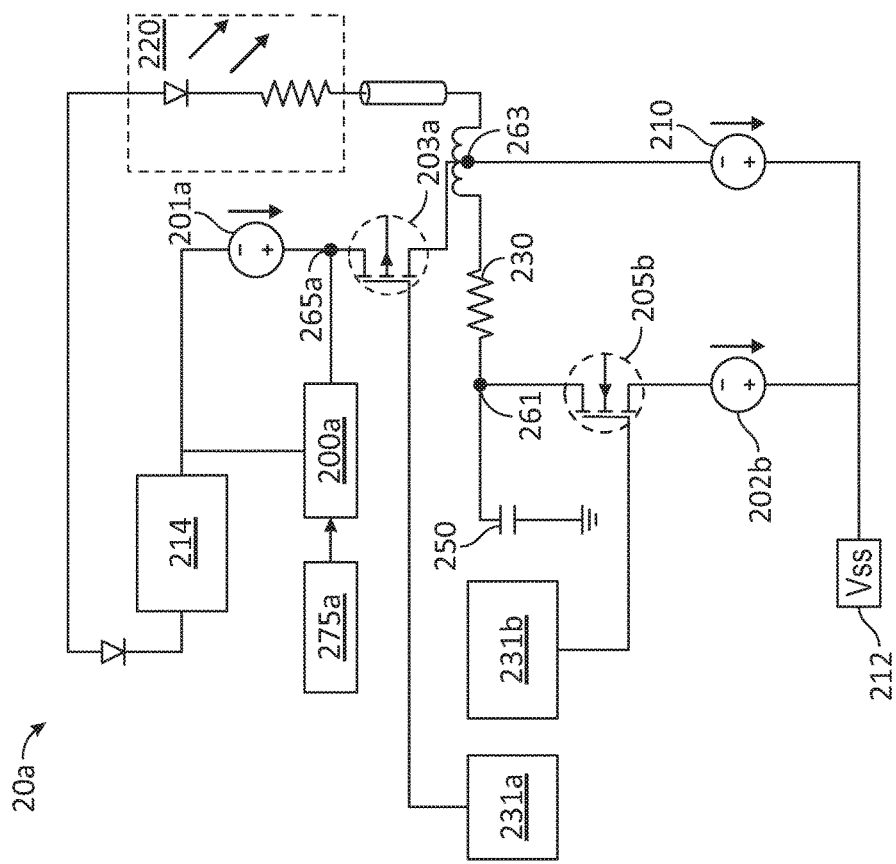
FIG. 2A illustrates an opto-electronic system including a charge-sharing element to assist in the falling edge of a signal transduction, according to some embodiments.

FIG. 2A illustrates an opto-electronic data link 20a including a charge-sharing element 200a to assist in the falling edge portion of a signal transduction, according to some embodiments. Opto-electronic data link 20a includes a main current supply having a source terminal 201a and a switch 203a. Switch 203a is controlled by an electric input signal 231a. Further, in some embodiments switch 203a is a positive channel FET (PFET). Opto-electronic data link 20a also includes a switch 205b configured to couple a sink terminal 202b of an auxiliary current source with an output node 263 upon receipt of an electric input signal 231b. In some embodiments, switch 205b includes a negative channel, field effect transistor (NFET), which is turned 'on' by a rising edge in electric input signal 231b. In some embodiments, electric input signals 231a and 231b (hereinafter, collectively referred to as "electric input signals 231") are complementary to each other. Accordingly, when electric input signal 231a is high, electric input signal 231b is low. And when electric input signal 231a is low electric input signal 231b is high. When switches 203a and 205b are turned on (e.g., when electric input signal 231a is low), a current flows through a resistor 230 (e.g., a termination resistor) from output node 263 to node 261, rising the voltage of output node 263 and reducing the current through load 220 below a bias current value provided by a bias current supply 210.

Opto-electronic data link 20a also includes a variable capacitor 200a coupled in parallel to source terminal 201a at a common node 265a on a source terminal of switch 203a, and coupled to a regulator 214. Variable capacitor 200a is selected by a programmable signal 275a to increase a charge transfer rate from output node 263 coupled to a load 220, when switch 203a is turned on. Accordingly, the falling slew rate of load 220 may be enhanced by increasing a capacitance value in variable capacitor 200a to enable charge sharing at node 263, thus accelerating the time for the voltage at node 263 to be pulled up.

In some embodiments, load 220 may include a VCSEL and a transmission line. A driver for load 220 may include a regulator, a pre-driver, a T-coil, and a push-pull driver. Regulator 214 operates as a voltage protection for a high voltage source (Vdd). A capacitor 250 couples resistor 230 to ground for correct common mode termination voltage ($V_{cm}$) and stabilization at node 261. Embodiments consistent with opto-electronic data link 20a provide a driving current to load 220 with a high slew rate at the falling edge of a bit transfer on opto-electronic data link 20a (e.g., the falling edge of electric input signal 231a). For example, variable capacitor 200a may increase the falling slew rate for the current driving load 220, as it increases a charge transfer rate when switch 203a is turned on by the falling edge of electric input 231a (e.g., a falling edge of an electric input 231a).

When switch 203a is turned on, common node 265a couples with node 261 and a large charge surplus from variable capacitor 200a ("charge sharing") charges common node 265a to a steady state voltage value ($V_{cm}$). In general, the larger the capacitance of variable capacitor 200a, the more extra charge will be available for sharing to drive $V_{cm}$ to a steady state value, thus improving the falling slew rate of the driver for load 220.

In some embodiments, opto-electronic data link 20a is configured so that when switch 203a is off, then the capacitance of variable capacitor 200a is effectively decoupled from output node 263, and is therefore invisible for the purposes of a rising slew rate of load 220. Moreover, when switch 203a is on, then the capacitance of variable capacitor 200a is coupled in series with the inherent capacitance of switch 203a (which is a low capacitive PFET), and therefore the net capacitive effect on output node 263 is still low. Further, when switch 203a is on, common node 265a is coupled to biased FETS (e.g., a PFET in switch 203a and an NFET in switch 205b), which keep $V_{cm}$ nearly constant after a steady-state value is achieved. In this regime, changes in the voltage of output node 263 (modulating the optical signal from load 220) cause a limited charge displacement from variable capacitor 200a. The net result is that, even when switch 203a is on, the equivalent capacitance introduced by variable capacitor 200a is relatively small, as seen from output node 263.

Figure 2B:
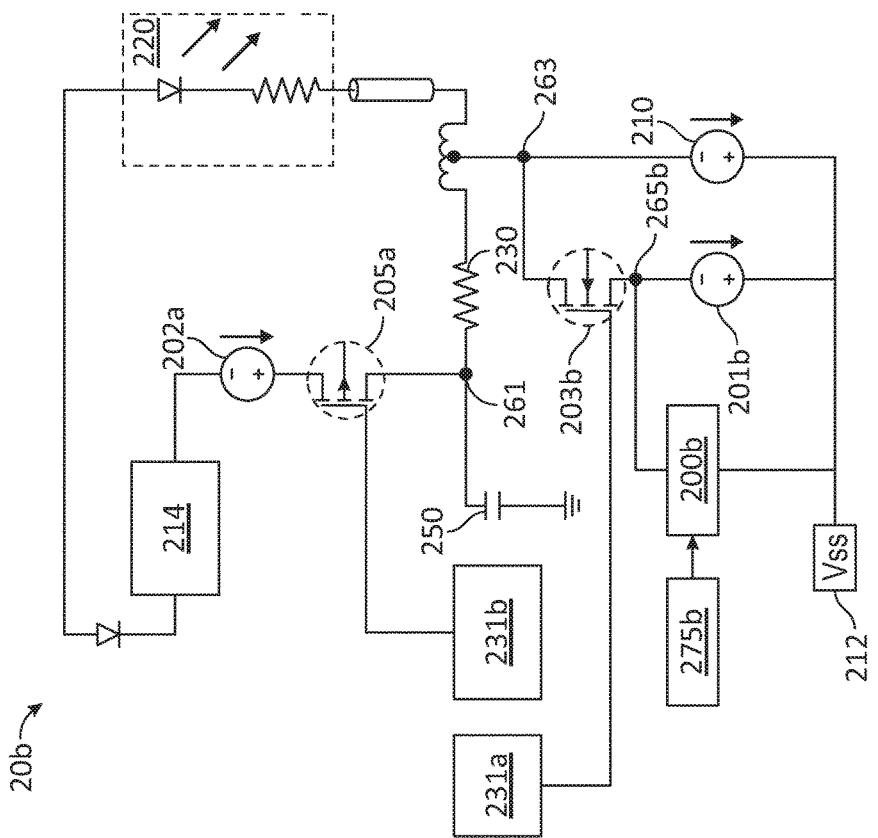
FIG. 2B illustrates an opto-electronic system including a charge-sharing element to assist in the rising edge of a signal transduction, according to some embodiments.

FIG. 2B illustrates an opto-electronic system 20b including a charge-sharing element to assist in the rising edge of a signal transduction, according to some embodiments. Opto-electronic data link 20b includes a switch 205a configured to couple source terminal 202a of the auxiliary current source with output node 263 upon receipt of an electric input signal 231b. In some embodiments, switch 205a includes a PFET, which is turned 'on' by a falling edge in electric input signal 231b. Opto-electronic data link 20b also includes sink terminal 201b of the main current supply and switch 203b. Switch 203b is controlled by electric input signal 231a. Further, in some embodiments switch 203b is an NFET. When switches 203b and 205a are turned on (e.g., when electric input signal 231a is high), a current flows through resistor 230 from node 261 to output node 263, lowering the voltage of output node 263 and increasing the current through load 220 over the bias current value provided by bias current supply 210.

Opto-electronic data link 20b also includes a variable capacitor 200b coupled in parallel to sink terminal 201b at a common node 265b and to a source terminal of switch 203b. In some embodiments, variable capacitor 200b is coupled to sink voltage Vss 212 (e.g., ground). Variable capacitor 200b is selected by a programmable signal 275b to increase a charge transfer rate from common node 265b to node 261, when switch 203b is turned on. Accordingly, the rising slew rate of load 220 may be enhanced by increasing a capacitance value in variable capacitor 200b to enable charge sharing at node 263 and accelerating the time for the voltage at node 263 to be pulled down.

FIG. 3 illustrates a variable capacitor 300 for charge sharing in an opto-electronic system (e.g., opto-electronic systems 10, 20a and 20b), according to some embodiments. Variable capacitor 300 includes multiple capacitive elements 330-1, 330-2, through 330-n (hereinafter, collectively referred to as "capacitive elements 330") coupled in parallel between common node 365 and a Vss sink 312 (e.g., ground) and configured to be activated by a programmable signal 375. Programmable signal 375 controls the strength of the charge sharing effect through adjustment of the capacitance of variable capacitor 300. In some embodiments, common node 365 may be the source terminal of a switch in the sink terminal of an auxiliary current supply (e.g., common node 265a, and switch 205b in sink terminal 202b). Programmable signal may include bits 310-1, 310-2, through 310-n (hereinafter, collectively referred to as "bits 310"), which activate the gates of transistors 320-1, 320-2 through 320-n (hereinafter, collectively referred to as "transistors 320"), respectively. When transistors 320 are NFETs, then high bits 310 add the capacitance of the respective one of capacitive elements 330 to the capacitance value of variable capacitor 300.

In some embodiments, capacitors 310 may be classified as most significant bit (MSB) or least significant bit (LSB) based on the value of capacitors 330. In some embodiments, the value of capacitor 330 for a MSB is twice as large as the value of capacitor 330 for a LSB. Accordingly, one MSB "finger" and one LSB "finger" may allow for 0, 1, 2, and 3 different capacitance value strengths. In some embodiments, each of the different capacitance value strengths may be associated with a strength level in an eye diagram of a BER graph for a serial link using the opto-electronic system coupled to variable capacitor 300.

Figure 4:
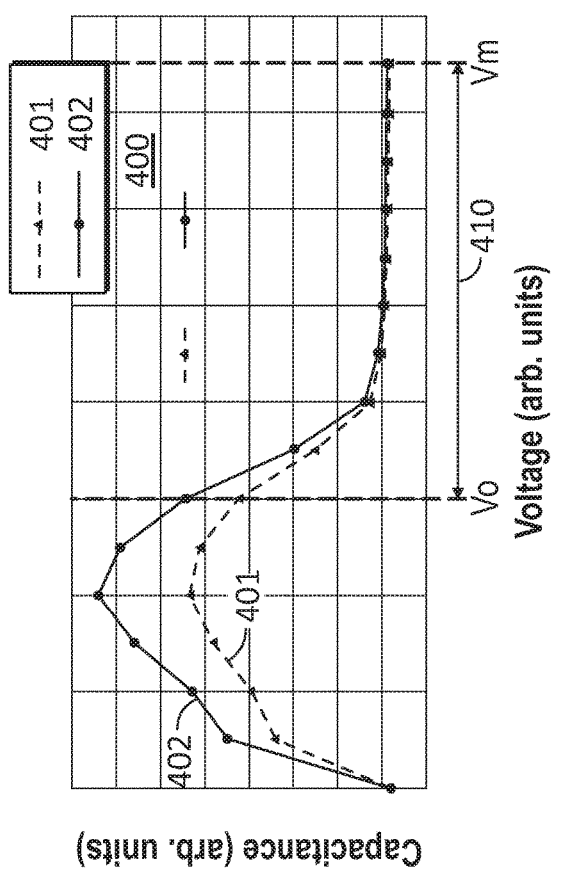
FIG. 4 illustrates a variable capacitance chart of an output node in an opto-electronic system including a charge sharing element, according to some embodiments.

FIG. 4 illustrates a variable capacitance chart 400 of an output node (e.g., output nodes 163 and 263) in an opto-electronic system including a charge sharing element (e.g., variable capacitors 100, 200a, and 300, in opto-electronic systems 10, 20a and 20b), according to some embodiments. Chart 400 plots capacitance in the ordinates (Y-axis, arbitrary units) as a function of voltage (at the output node) in the abscissae (X-axis, arbitrary units). A curve 401 corresponds to a variable capacitor at its lowest capacitance value (e.g., all bits 310 set to low, cf. FIG. 3). A curve 402 corresponds to the switched capacitor at its highest capacitance value (e.g., all bits 310 set to high).

An operating voltage region 410 for a VCSEL (e.g., light emitting device 120, or load 220) may span from voltage Vo to voltage Vm. It can be seen that in the high output voltage region the difference between curves 401 and 402 is very small. Further, the value of capacitance in curves 401 and 402 is also relatively small, as compared to a voltage region below Vo.

Figure 5:
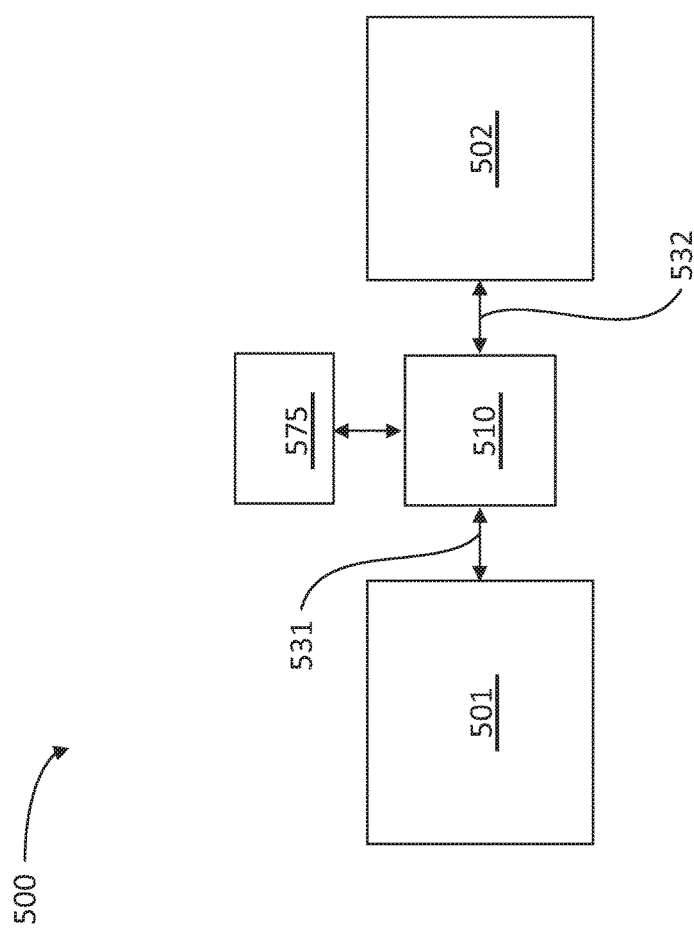
FIG. 5 illustrates a serial interface for transducing an electrical signal from a transmitter into an optical signal for a receiver, according to some embodiments.

FIG. 5 illustrates a serial interface 500 for transducing an electrical input signal 531 from a transmitter 501 into an optical output signal 532 for a receiver 502, according to some embodiments. Serial interface 500 includes an opto-electronic data link 510 to transduce electrical signal 531 into optical signal 532 (e.g., opto-electronic data links 10, 20a and 20b).

In some embodiments, serial interface 500 includes a processor 575 configured to provide a programmable signal to improve a slew rate of a light emitting device in opto-electronic data link 510 (e.g., programmable signals 275a and 375 and light emitting devices 120 or 220-aVCSEL-).

In some embodiments, serial interface 500, wherein the light emitting device comprises a load having a slew rate that defines an eye opening pattern in a bit-error rate diagram.

In some embodiments, opto-electronic data link 510 includes a first variable capacitor. A capacitance of the first variable capacitor may be adjusted based on a slew rate of a load coupled to a current source driving the load, and on a bit-error rate between electrical input signal 531 and optical output signal 532.

FIGS. 6A-B illustrate multi-level eye diagrams 600A and 600B (hereinafter, collectively referred to as "eye diagrams 600") respectively, for a serial interface assisted by a charge-sharing element (e.g., serial interface 500, cf. FIG. 5), according to some embodiments. Eye diagrams 600 illustrate a BER for electrical-to-optical data conversion using a VCSEL as the load of the serial interface (cf. light emitting diode 120 or load 220). The ordinate of eye diagrams 600 (Y-axis, in arbitrary units) indicates the value of an optical signal produced by the VCSEL (e.g., optical signal 132, cf. FIG. 1) and the abscissae of eye diagrams 600 (X-axis, in arbitrary units) indicates time.

Eye diagram 600A corresponds to a charge-sharing element with a low capacitance value (e.g., all bits 310 set to low, cf. FIG. 3, as shown in curve 401, cf. FIG. 4). Eye diagram 600B corresponds to a charge-sharing element with a high capacitance value (e.g., all bits 310 set to high, cf. FIG. 3, as shown in curve 402, cf. FIG. 4). Accordingly, the addition of a charge-sharing element enhances the BER performance, as eye diagram 600B illustrates a wider "eye opening" at all signal levels (four different signal levels) and less jitter over the abscissae, relative to eye diagram 600A.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A device, comprising:
   a switch configured to couple a current source with an output terminal upon receipt of a data signal; and
   a first variable capacitor coupled in parallel to the current source at a common node on a source terminal of the switch, wherein the first variable capacitor comprises multiple capacitive elements coupled in parallel and configured to be activated by a programmable signal, and wherein the programmable signal is selected to increase a charge transfer rate from an output terminal coupled to a load, when the switch is turned on.

2. The device of claim 1, wherein the switch comprises at least one of a negative channel field effect transistor or a positive channel field effect transistor.

3. The device of claim 1, wherein the multiple capacitive elements comprise at least one field effect transistor coupled in series with a capacitor, and the programmable signal comprises a bit signal to a gate of the field effect transistor.

4. The device of claim 1, wherein the current source comprises a sink terminal of an auxiliary current source configured to maintain a voltage of the common node at a fixed value when a current lower than a bias current is provided to a load.

5. The device of claim 1, wherein the current source comprises a source terminal of a main current source configured to provide a current through a resistor having a first terminal at an output node and a second terminal at the common node, the current flowing from the first terminal to the second terminal to induce a current lower than a bias current through a load coupled in parallel with the source terminal.

6. The device of claim 1, wherein the current source comprises a source terminal of an auxiliary current source configured to maintain a voltage of the common node at a fixed value when a current higher than a bias current is provided to a load.

7. The device of claim 1, wherein the current source comprises a sink terminal of a main current source configured to provide a current through a resistor having a first terminal at the common node and a second terminal at an output node, the current flowing from the first terminal to the second terminal configured to induce a current higher than a bias current through a load.

8. The device of claim 1, further comprising a second variable capacitor coupled in parallel to a source terminal of a main current source, wherein the second variable capacitor comprises multiple capacitive elements coupled in parallel and configured to be activated by a programmable signal, and wherein the programmable signal is selected to increase a charge transfer rate from the output terminal when a second switch activates the source terminal of the main current source.

9. The device of claim 1, wherein a capacitance of the first variable capacitor is adjusted based on a slew rate of a load coupled to the current source.

10. The device of claim 1, wherein a capacitance of the first variable capacitor is adjusted based on a rising slew rate of a load coupled to the current source, and on a falling slew rate of the load.

11. A system, comprising:
a light emitting device;
a data channel configured to provide a data signal;
a switch configured to couple a current source with the light emitting device upon receipt of the data signal; and
a first variable capacitor coupled in parallel to the current source at a common mode node on a source terminal of the switch, wherein the first variable capacitor comprises a plurality of capacitive elements coupled in parallel and configured to be activated by a programmable signal, and wherein the programmable signal is selected to increase a slew rate from the light emitting device when the switch is turned on and when the switch is turned off.

12. The system of claim 11, further comprising a processor configured to provide the programmable signal to improve a slew rate of the light emitting device.

13. The system of claim 11, wherein the light emitting device comprises a load having a slew rate that defines an eye opening pattern in a bit-error rate diagram.

14. The system of claim 11, wherein a capacitance of the first variable capacitor is adjusted based on a slew rate of a load coupled to the current source and a bit-error rate of an output signal from the light emitting diode.

15. A serial interface, comprising:
an opto-electronic data link, comprising:
a light emitting device configured to convert an electric input signal into an optical output signal;
a data channel configured to provide the electric input signal;
a switch configured to couple a current source with the light emitting device upon receipt of the electric input signal; and
a variable capacitor coupled in parallel to the current source at a common node on a source terminal of the switch, wherein the variable capacitor comprises multiple capacitive elements coupled in parallel and configured to be activated by a programmable signal, and wherein the programmable signal is selected to reduce a bit error rate between the electric input signal and the optical output signal.

16. The serial interface of claim 15, further comprising a processor configured to provide the programmable signal according to a bit error rate measured for the optical output signal.

17. The device of claim 15, wherein the switch comprises at least one of a negative channel field effect transistor or a positive channel field effect transistor.

18. The device of claim 15, further comprising a second variable capacitor coupled in parallel to a source terminal of a main current source, wherein the second variable capacitor comprises multiple capacitive elements coupled in parallel and configured to be activated by a programmable signal, and wherein the programmable signal is selected to differentially increase a rising slew rate and a falling slew rate of an optical signal from the light emitting diode.

19. The device of claim 15, wherein the multiple capacitive elements comprise at least one field effect transistor coupled in series with a capacitor, and the programmable signal comprises a bit signal to a gate of the field effect transistor.

20. The device of claim 15, wherein the current source comprises a sink terminal of an auxiliary current source configured to maintain a voltage of the common node at a fixed value when a current lower than a bias current is provided to a load.

* * * * *